United States Patent Office 3,559,276
Patented Feb. 2, 1971

3,559,276
METHOD FOR MAKING A METAL LAMINATE
Ray B. Anderson, Attleboro, Mass., assignor to Texas Instruments Incorporated, Dallas, Tex.
No Drawing. Filed Dec. 30, 1968, Ser. No. 788,077
Int. Cl. B23k 21/00
U.S. Cl. 29—470.1                             15 Claims

ABSTRACT OF THE DISCLOSURE

A method is shown for economically manufacturing an easily formed and easily brazed metal laminate of precisely controlled thickness for use in making corrosion-resistant automotive brake tubing, the laminate incorporating a very thin inner layer of stainless steel of substantially uniform thickness sandwiched between and metallurgically bonded to outer layers of low carbon steel. The method includes the steps of contacting opposite clean surfaces of an annealed stainless steel strip with respective clean surfaces of a pair of annealed low carbon steel strips, squeezing the strips together with substantial reduction in the thicknesses thereof for metallurgically bonding the strips together to form a laminate having an inner layer of stainless steel, and heating the laminate for increasing the strength of the metallurgical bonds between the strip materials and for annealing strip materials. The laminate is then subjected to substantial tension between two spaced locations for minimizing the difference in resistance to compressive reduction which would otherwise exist in the low carbon steel and stainless steel materials in the laminate. The tensioned laminate is then squeezed with substantial force between said spaced locations to achieve substantial reduction in the thickness of the laminate material, thereby to form the desired thin inner layer of stainless steel of substantially uniform thickness without risk of forming discontinuities in the stainless steel layer while simultaneouly reducing the laminate material to substantially the desired overall thickness. The laminate is then annealed again to provide the laminate with the property of easy formability.

---

In a novel and improved metal laminate, an inner layer of stainless steel is sandwiched between and metallurgically bonded to outer layers of low carbon steel. This laminate is adapted to be made into brazed, double-wall tubing suitable for use as automotive brake tubing, in which application the inner stainless steel layer provides the brake tubing with corrosion-resistance properties vastly superior to brake tubing presently used. However, if such a laminate material is to be manufactured and used in forming brake tubing at a cost which is commercially competitive with present materials, the inner layer of stainless steel must be very thin to provide the laminate with formability properties comparable to low carbon steel and to minimize raw material cost. On the other hand, the thin stainless steel layer must be of uniform thickness and must be free of discontinuities to assure a reliable degree of resistance to corrosion. Further, the overall thickness of the laminate must be precisely controlled in order to permit economical manufacture of brake tubing using automated production equipment. In this regard it is found that the materials embodied in the laminate differ substantially in hardness so that, in forming the desired thin inner layer of stainless steel of uniform thickness, difficulties are experienced in producing the laminate with consistently uniform properties.

It is an object of this invention to provide novel and improved methods for manufacturing a metal laminate embodying an inner layer of stainless steel sandwiched between and metallurgically bonded to outer layers of low carbon steel; to provide such methods by which the inner stainless steel layer of the laminate is reduced to a thin uniform thickness without risk of forming discontinuities in the stainless steel layer; to provide such methods which permit precise control of the overall thickness of the laminate; and to provide such methods which permit consistent manufacture of the desired laminate in an economical manner.

Other objects, advantages and details of the novel and improved methods of this invention appear in the following detailed description of preferred embodiments of the invention.

In accordance with the method of this invention, two thin elongated strips of low carbon steel and one thin elongated strip of stainless steel are processed for providing strips of the proper relative thickness in annealed condition with surfaces which are free of bond deterrent materials. That is, if necessary, the strips are roll-squeezed or otherwise reduced in thickness so that the strips have the same thickness relationship as is desired between the material layers in the laminate to be made according to the invention. As necessary, the strips are cleaned by passing the strips through degreasing baths and the like, are abraded or otherwise scrubbed for removing bond deterrents from the principal surfaces of the strips, and are annealed to provide the strips in fully soft condition.

For example, in a preferred embodiment of this invention in which the method of the invention is used in forming a laminate having a thickness of $$0.0140 {}^{+0.0000}_{-0.0005} \text{ inch}$$

and having an inner stainless steel layer comprising 10 percent of the overall thickness of the laminate, a stainless steel strip is sandwiched between two low carbon steel layers of equal thickness. The low carbon steel strips typically comprise SAE 1008 or SAE 1010 steel in annealed condition having a width of about 8.750 inches and a thickness of slightly more than 0.075 inch. The stainless steel starting material typically comprises SAE 304 stainless steel in annealed condition having a width of 8.750 inches and a thickness greater than 0.020 inch. In accordance with this invention, the principal surfaces of the low carbon steel strips are abraded with a No. 60 grit, continuous, abrasive belt for removing scale, gross contaminants and metal oxide films from the strip surfaces, the resulting steel strips having a thickness of about 0.075 inch. The stainless steel strip is roll-squeezed for reducing the thickness of the strip of 0.017 inch; the strip is bright annealed, and the principal surfaces of the strip are subjected to wire brushing for removing gross contaminants from the strip surfaces. For bright annealing, the stainless steel strip is preferably passed through a heat zone having a temperature on the order of 1900° F. to 2000° F. in a conventional strip annealing apparatus, the strip being permitted to remain in the heat zone for a period of about 1½ minutes.

In accordance with this invention, the clean surfaces of the low carbon steel strips are contacted with respective opposite clean surfaces of the stainless steel strip and the strips are squeezed together with substantial reduction in the thicknesses thereof to form at least limited metallurgical bonds between the strip materials. For example, the contacting strips are preferably squeezed together in a roll-squeezing mill to achieve from about 50% to 80% reduction in the thicknesses of the strips. Preferably where the strip materials specifically described above are to be bonded together, the strips are squeezed together with approximately 67% reduction in the strip thicknesses. In the preferred method of this invention, the strips are squeezed together without preliminary heating of the strip materials so that reduction of the strips occurs at room temperature (approximately 68° F.) or at the slightly higher temperature resulting from heat generated during the squeezing process. Alternately, however, within the scope of this invention, one or both of the strip materials are preliminarily heated to temperatures up to about 1000° F. to facilitate reduction of the strip thicknesses. For example, where the strip materials specifically described above are utilized in the method of this invention, the low carbon steel and stainless steel strips having starting thicknesses of 0.075 inch and 0.017 inch respectively are squeezed together without preliminary heating to achieve approximately 67% reduction in the thicknesses of each of the strip materials, thereby to form an initially bonded laminate having a thickness on the order of 0.054 to 0.058 inch and preferably about 0.057 inch. Preferably, the initially-bonded laminate is coiled as it is moved from the roll-squeezing mill in conventional manner, the convolutions of the coil preferably being separated with paper interleaving materials or the like.

In accordance with this invention, the initially-bonded laminate is then heated and otherwise processed for increasing the bonds between the strip materials in the laminates, for annealing the materials embodied in the laminate, and for providing the surfaces of the laminate with a suitable surface finish. For example, in one embodiment of the method of this invention, the initially-bonded laminate material is heated in a conventional bell annealing furnace at a temperature and for a sufficient period of time to substantially complete the metallurgical bonds between the strip materials in the laminate by diffusion in the strip materials within the laminate and to anneal the low carbon steel materials in the laminate. For example, where the laminate embodies the materials specifically described above, the laminate is preferably heated to a temperature of about 1250° F. for a period of 3 hours in conventional bell annealing furnace for substantially completing the metallurgical bonds between the strip materials and for substantially fully annealing the low carbon steel materials in the laminate. In this process step, coils of the laminate material weighing from about 2000 to 5000 pounds each are conveniently processed at one time. As this process step results in the formation of scale on the laminate surfaces, the now fully bonded laminate is then cleaned for removing such scale. For example, the laminate is preferably scrubbed with wire brushes, is edge trimmed to provide straight edges on the laminate, and is abraded with a No. 60 grit, abrasive belt or the like for removing scale and other extraneous material from the laminate surfaces. The fully bonded laminate is then passed through conventional strip annealing apparatus, preferably having a neutral or non-oxidizing protective atmosphere, wherein the laminate is heated to a temperature sufficient for annealing the stainless steel material of the laminate. For example, the laminate embodying the materials specifically described above is passed through a strip annealer at a temperature of about 1900° F. at a rate such that the laminate is within a zone at this temperature for about 1 to 4 minutes and preferably for about 2 minutes.

In an alternate preferred embodiment of this invention, the initially-bonded laminate material described above is initially heated to a lower temperature on the order of 750° F. to 950° F. in a bell annealing furnace for a period of several hours or more for completing the metallurgical bonds between the strip materials in the laminate without the formation of any significant amount of metal oxide scale or the like on the laminate surfaces and without any substantial annealing of either of the laminate materials. The resulting fully bonded laminate is then passed through the described conventional strip annealing apparatus at the temperatures and annealing time as above described for annealing both the low carbon steel and stainless steel constituents of the laminate. In this alternate process, the fully bonded laminate is cleaned or not as desired between the initial heating and strip annealing treatments as above described.

In another alternate process of this invention, the initially-bonded laminate is subjected to high temperature treatment in a conventional bell annealing furnace or the like for simultaneously completing the metallurgical bonds between the strip materials in the laminate and for annealing all of the laminate materials. For example, where the initially-bonded laminate embodies the low carbon steel and stainless steel materials specifically described above, the initially-bonded laminate is preferably heated to a temperature on the order of 1950° F. for a period of about 1 to 3 hours in a conventional bell annealing furnace for simultaneously completing the metallurgical bonds between the strip materials and for annealing both of the strip materials in the laminate. The surfaces of the annealed laminate are then cleaned in the manner above described if necessary for removal of any surface scale or the like. It should be understood that where other strip materials are to me embodied in the initially-bonded laminate, as where the stainless steel layer of the laminate comprises SAE 430 Stainless Steel, other sintering and annealing temperatures are employed in the process of this invention.

In accordance with this invention, the fully bonded laminate material, now in fully annealed condition and having good surface finishes, is again passed through conventional roll-squeezing means for reducing the thickness of the laminate material, thereby to reduce the stainless steel layer of the laminate to a very thin layer of substantially uniform thickness free of discontinuities and to reduce the overall thickness of the laminate material to a precisely controlled final gauge or thickness. In accordance with this invention, this reduction of the laminate is accomplished by placing the laminate under substantial front and back tension as the laminate is passed between the rolls of the squeezing mill, thereby to reduce the difference in resistance to compressive reduction which would otherwise exist when rolling a laminate material embodying such thin metal layers. It is also an important part of this invention to squeeze the tensioned laminate with substantial compressive force to achieve a substantial reduction in the laminate thickness with each pass of the laminate through the roll-squeezing mill. In this way, any tendency for building up of thick and thin portions of the stainless steel layer is minimized so that a final, thin layer of stainless steel of uniform thickness is achieved in the laminate material. For example, where the fully bonded laminate material is fed from a supply reel and is passed through the rolling mill to be coiled upon a take-up reel in conventional manner, the supply reel is preferably subjected to substantial dragging force while the take-up reel is driven with substantial force so that roll squeezing of the laminate is accomplished between two locations at which tension is applied to the laminate. In this regard, it is found that substantial tensile stress should be established within the laminate as it is squeezed, the force establishing this front tensile stress preferably being greater than about 20,000 pounds per square inch. As will be understood, a substantial part of the force is applied to the stainless steel layer which has the greatest resistance to tensile stress of the laminate materials, whereby the thin stainless steel layer of the laminate is reduced in thickness uniformly with the low carbon steel layers. For example, where the laminate material embodying the specific materials above described has an overall thickness of about 0.057 inch after the annealing step above described, the laminate is preferably subjected to three passes through a roll-squeezing mill in which the strip is reduced to thicknesses of 0.0325 inch (a 45% reduction), 0.020 inch (a 39% reduction), and to 0.0155 inch (a 23% reduction) respectively, the laminate being subjected to front and back tensions of about 9000 and 23,500 pounds per square inch, 12,000 and 25,000 pounds per square inch, and 13,000 and 25,000 pounds per square inch respectively during these reductions of the laminate thickness.

In accordance with this invention, the rolled laminate material is then preferably subjected to one or two additional passes through a conventional rolling mill for reducing the laminate thickness to the described final, precisely controlled gauge. For example, the above-described specific laminate is preferably reduced to a thickness of $$0.0140 ^{+.0000}_{-.0005} \text{ inch}$$

thickness by means of these kiss passes thereby to provide the laminate with suitably smooth and finished surfaces. In accordance with this invention, the laminate is then annealed, preferably by strip annealing means, for providing the final laminate with the desired property of easy formability. For example, the laminate specifically described above is preferably passed through conventional strip annealing apparatus wherein the laminate is annealed at a temperature of about 1950° F. for a period of about 90 seconds. In an alternate process of this invention, where better surface finish is desired, the laminate is subjected to the above-described kiss passes for bringing the laminate to final gauge after annealing of the laminate, these kiss passes resulting in no significant work-hardening of the laminate materials.

In accordance with this invention, the final laminate material is preferably slit to the desired width in any conventional manner, preferably with use of a slitting lubricant which is left on the surfaces of the laminate as a rust preventitive. As the laminate material is intended to be subsequently electroplated with copper or brazed by means of a molten copper bath in forming brake tubing materials, the slitting lubricant is preferably characterized by the absence of sulfur, phosphor, chromium and other materials which would tend to contaminate copper plating or molten copper baths. In this way, the laminate is adapted to be plated or brazed without requiring any substantial cleaning steps for removal of the slitting, rust-preventitive lubricant material.

It will be understood that the process described above requires heating or sintering of the laminate materials after initial roll bonding in order to complete the metallurgical bonds between the strip materials in the laminate. It is convenient to regulate this heating to achieve annealing of the laminate materials. The laminate must also be subjected to a final annealing step in order to provide the final laminate with the property of easy formability comparable to the formability of low carbon steel. Therefore, in order to permit economical manufacture of the laminate material in accordance with this invention, it is desirable to select initial starting thicknesses for the strip materials used in the laminate so that the thickness of the initially-bonded, sintered and annealed laminate is adapted to be raised to full work-hardened condition during rolling of the laminate to the final gauge or thickness. In this way, a maximum amount of laminate material is obtained without requiring an intermediate annealing of the laminate material between the annealing after bonding and the final annealing step. This absence of intermediate annealing also facilitates reduction of the stainless steel layer of the laminate to the desired thin uniform thickness in accordance with this invention. For example, in reducing the laminate specifically described above from a thickness of 0.057 inch in annealed condition to a final thickness of 0.0140 inch, the maximum reduction in thickness and therefore the maximum amount of rolled laminate material is achieved without raising either of the laminate materials above full work-hardened condition.

It should be understood that although particular embodiments of the methods of this invention have been described by way of illustration, this invention includes all modifications and equivalents thereof falling within the scope of the appended claims.

I claim:

1. A method for making a metal laminate having a relatively thin inner layer of relatively hard metal sandwiched between and metallurgically bonded to relatively thicker outer layers of relatively softer metal, said method comprising the steps of contacting surfaces of a relatively hard metal strip with respective surfaces of a pair of relatively thicker and softer metal strips, squeezing said strips together with substantial reduction in the thicknesses thereof for forming a laminate having an inner layer of relatively hard metal sandwiched between and metallurgically bonded to a limited extent to relatively thicker outer layers of relatively softer metal, heating said laminate for increasing the metallurgical bonds between said layers and for annealing said metals of said layers, and subjecting said laminate to substantial tensile force for decreasing the difference in resistance to compressive reduction displayed by said layers of said laminate while simultaneously squeezing said tensioned laminate with substantial reduction in the thickness thereof to form a laminate having said relatively thin inner layer of said relatively hard metal.

2. A method for making a metal laminate of precisely controlled thickness having a relatively thin inner layer of stainless steel sandwiched between and metallurgically bonded to relatively thicker outer layers of low carbon steel, said method comprising the steps of contacting clean surfaces of a strip of stainless steel with respective clean surfaces of a pair of relatively thicker strips of low carbon steel, squeezing said strips together with substantial reduction in the thicknesses thereof for forming an initially-bonded laminate having an inner layer of stainless steel sandwiched between and metallurgically bonded to a limited extent to relatively thicker outer layers of low carbon steel, heating said initially-bonded laminate for substantially completing the metallurgical bonds between said metal layers and for annealing said low carbon steel and stainless steel layers to form a fully-bonded laminate, and subjecting said fully-bonded laminate to substantial tensile stress for decreasing the difference in resistance to compressive reduction displayed by said stainless steel and low carbon steel layers while simultaneously squeezing said tensioned laminate with substantial reduction in the thickness thereof to form said laminate of precisely controlled thickness having said relatively thin inner layer of stainless steel.

3. A method as set forth in claim 2 wherein said stainless steel and low carbon steel strips are squeezed together with between 50% and 80% reduction in the thicknesses thereof for forming said initially-bonded laminate.

4. A method as set forth in claim 2 wherein said fully-bonded laminate is subjected to tensile stress of at least about 20,000 pounds per square inch.

5. A method as set forth in claim 2 wherein said laminate having said relatively thin inner layer of stainless steel is subsequently annealed for providing said laminate with the property of formability comparable to low carbon steel.

6. A method as set forth in claim 2 wherein said laminate having said relatively thin inner layer of stainless steel is subsequently annealed at a temperature of about 1950° F. for a period of about 90 seconds for providing said laminate with the property of formability comparable to low carbon steel.

7. A method for making an easily formed and easily brazed metal laminate of precisely controlled thickness having a relatively thin inner layer of stainless steel of substantially uniform thickness sandwiched between and metallurgically bonded to relatively thicker outer layers of low carbon steel, said method comprising the steps of contacting clean surfaces of a strip of stainless steel in annealed condition with respective clean surfaces of a pair of relatively thicker strips of low carbon steel in annealed condition, squeezing said strips together with between about 50% and 80% reduction in the thicknesses thereof at room temperature for forming an initially-bonded laminate having an inner layer of stainless steel sandwiched between and metallurgically bonded to a limited extent to relatively thicker outer layers of low carbon steel, heating said initially-bonded laminate for substantially completing the metallurgical bonds between said laminate layers and for annealing said laminate layers to form a fully-bonded laminate, subjecting said fully-bonded laminate to subsantial tensile stress for decreasing the difference in resistance to compressive reduction displayed by said stainless steel and low carbon steel layers while simultaneously squeezing said tensioned laminate with reduction in the thickness thereof sufficient to form said laminate of precisely controlled thickness having said relatively thin inner layer of stainless steel of substantially uniform thickness without exceeding fully-work-hardened condition in either of the laminate layers, and annealing said laminate to provide said laminate with the property of easy formability.

8. A method as set forth in claim 7 wherein said initially-bonded laminate is heated to a temperature on the order of 1250° F. for completing said metallurgical bonds between said laminate layers and for annealing said low carbon steel layers of said laminate, said laminate being subsequently heated to a temperature on the order of 1100° F. for annealing said stainless steel layer of said laminate, said laminate being abraded between said heating steps for removing scale from the surface of said laminate.

9. The method as set forth in claim 7 wherein said initially-bonded laminate is heated to a temperature between about 750° F. and 950° F. for completing said metallurgical bonds between said laminate layers, said laminate being subsequently heated to a temperature on the order of 1900° F. for annealing said stainless steel and low carbon steel layers of said laminate.

10. The method as set forth in claim 7 wherein said initially-bonded laminate is heated to a temperature on the order of 1900° F. for completing said metallurgical bonds between said metal layers and for annealing said stainless and low carbon steel layers of said laminate.

11. A method for making an easily formed and easily brazed metal laminate of precisely controlled thickness having a relatively thin layer of stainless steel of substantially uniform thickness sandwiched between and metallurgically bonded to relatively thicker outer layers of low carbon steel, said method comprising the steps of abrading respectively surfaces of a pair of relatively thick low carbon steel strips for removing bond-deterrent materials therefrom, cleaning opposite surfaces of a relatively thinner stainless steel strip for removing gross contaminants therefrom, contacting said surfaces of said low carbon steel strips with respective opposite surfaces of said stainless steel strip, squeezing said strips together with between about 50% and 80% reduction in the thicknesses thereof at room temperature for forming an initially-bonded laminate having an inner layer of stainless steel sandwiched between and metallurgically bonded to a limited extent to relatively thicker outer layers of low carbon steel, heating said initially-bonded laminate to a temperature of about 1250° F. for about 3 hours for completing said metallurgical bonds between said laminate layers and for annealing said low carbon steel layers of said laminate to form a fully-bonded laminate, abrading said fully-bonded laminate for removing scale therefrom, heating said fully-bonded laminate to a temperature of about 1900° F. for a period of 1 to 4 minutes for annealing said stainless steel layer of said laminate, subjecting said fully-bonded laminate to tensile stress of at least about 20,000 pounds per square inch for decreasing the difference in resistance to compressive reduction displayed by said stainless steel and low carbon steel layer of said laminate while simultaneously squeezing said tensioned laminate with substantial reduction in the thickness thereof to form said laminate of said desired thickness having said relatively thin inner layer of stainless steel, and heating said laminate to a temperature of about 1900° F. for a period of about 90 seconds for annealing said laminate.

12. A method as set forth in claim 11 wherein said tensioned laminate is squeezed with relatively small reduction in the thickness thereof to form a laminate of said precisely controlled thickness.

13. A method as set forth in claim 12 wherein said laminate is squeezed with said small reduction thereof prior to said last-recited heating step.

14. A method as set forth in claim 12 wherein said laminate is squeezed with said small reduction thereof subsequent to said last-recited heating step.

15. A method as set forth in claim 12 wherein said low carbon steel strips have a thickness of about 0.075 inch and said stainless steel strip has a thickness of about 0.017 inch, said tensioned laminate being squeezed to form a laminate having a thickness of about 0.014 inch wherein the thickness of said inner layer of stainless steel comprises about 10% of said laminate thickness.

References Cited
UNITED STATES PATENTS

| | | | |
|---|---|---|---|
| 2,468,206 | 4/1949 | Keene et al. | 29—472.3X |
| 2,704,883 | 3/1955 | Hamilton et al. | 29—472.3X |
| 2,984,901 | 5/1961 | Cunningham et al. | 29—487 |
| 3,133,346 | 5/1964 | Allen | 29—470.1X |
| 3,384,950 | 5/1968 | Ruf | 29—487 |
| 3,393,445 | 7/1968 | Ulam | 29—472.3X |
| 3,470,607 | 10/1969 | Rader et al. | 29—472.3X |
| 3,475,812 | 11/1969 | Kennedy et al. | 29—472.3 |

JOHN F. CAMPBELL, Primary Examiner

R. B. LAZARUS, Assistant Examiner

U.S. Cl. X.R.

29—472.3, 487, 497.5